United States Patent [19]

Nobe et al.

[11] Patent Number: 5,583,775
[45] Date of Patent: Dec. 10, 1996

[54] NAVIGATION APPARATUS AND NAVIGATION METHOD

[75] Inventors: Kenichi Nobe; Morio Araki, both of Kawagoe, Japan

[73] Assignee: Pioneer Electronic Corporation, Tokyo-to, Japan

[21] Appl. No.: 427,817

[22] Filed: Apr. 26, 1995

[30] Foreign Application Priority Data

Apr. 28, 1994 [JP] Japan ..................... 6-091282

[51] Int. Cl.$^6$ .............................. G06F 165/00
[52] U.S. Cl. .................. 364/449.7; 364/444.1; 340/990; 340/995
[58] Field of Search ................... 364/443, 444, 364/449; 73/178 R; 340/988, 990, 995

[56] References Cited

U.S. PATENT DOCUMENTS

| | | | |
|---|---|---|---|
| 4,774,671 | 9/1988 | Itoh et al. | 364/444 |
| 4,984,168 | 1/1991 | Neukrichner et al. | 364/449 |
| 4,989,151 | 9/1991 | Nuimura | 364/449 |
| 5,262,775 | 11/1993 | Tamai et al. | 340/995 |
| 5,291,413 | 3/1994 | Tamai et al. | 364/444 |
| 5,291,414 | 3/1994 | Tamai et al. | 364/444 |
| 5,303,159 | 4/1994 | Tamai et al. | 364/444 |

*Primary Examiner*—Gary Chin
*Attorney, Agent, or Firm*—Young & Thompson

[57] ABSTRACT

A navigation apparatus for a movable body is provided with: a measurement device for measuring a present position of the movable body; a setting device for setting route position information corresponding to a plurality of scheduled route positions which are scheduled to be passed on a route to a destination; a memory device for storing the present position at predetermined time intervals as passed position information between a start time, which is a time when the setting device starts to set the route position information, and an end time, which is a time when the setting device ends to set the route position information; a judgement device for judging whether or not the movable body has passed the scheduled route positions between the start time and the end time on the basis of the passed position information stored in the memory device, after the end time; and a guidance device for generating a message to guide the movable body from the measured present position to the destination on the basis of the scheduled route positions which the movable body has not passed yet according to a judgement result of the judgement device.

14 Claims, 5 Drawing Sheets

FIG. 3

| POINTER | LOCUS DATA |
|---|---|
| 1 | $LO_1$ |
| 2 | $LO_2$ |
| 3 | $LO_3$ |
| ⋮ | ⋮ |
| m−2 | $LO_{m-2}$ |
| m−1 | $LO_{m-1}$ |
| m | $LO_m$ |

$P_S$ ← pointer 3

$P_E$ ← pointer m−1

▶ : SELF VEHICLE POSITION

NAVIGATION APPARATUS AND NAVIGATION METHOD

BACKGROUND OF THE INVENTION

1. Field of the Invention

The present invention generally relates to a navigation apparatus and a navigation method, and more particularly to a navigation apparatus and a navigation method in which a route guidance is performed by use of route data set in advance.

2. Description of the Related Art

There is a so-called "built-in type navigation apparatus" as a measuring apparatus for various movable bodies such as a vehicle, an aeroplane, a ship etc.. This built-in type navigation apparatus is constructed to obtain a two dimensional displacement (i.e. a vector amount) of the movable body from an azimuth data of an azimuth sensor and a speed data of a speed sensor and obtain a present position by integrating this two dimensional displacement on a standard point. Namely, in case of an automobile for example, it is constructed such that the number of pulses which are generated during one rotation of a drive shaft is set in advance, and that the travel distance is obtained by multiplying a distance, which is calculated from the total number of the pulses generated from the standard point to the present position, by a distance correction coefficient.

There is also a GPS (Global Positioning System) type navigation apparatus as a measuring apparatus, which utilizes artificial satellites. This GPS type navigation apparatus is constructed as following. Namely, it receives electric waves of three or more GPS satellites normally, and calculates a present position of a receiving point from the pseudo-distance data, which include a time offset of a receiver between each GPS satellite and the receiving point and the positional data of each GPS satellite. Then, an information processing device reads out map data, which include the calculated present position, from a map data storing device, to take in the data. Then, the information processing device forms image data from the taken-in map data and the information of the present position, and sends it to the display device to perform the image display. By this image, the automobile driver etc. who is a user can recognize the self present position in relation with the map.

Both of the above mentioned navigation apparatuses are constructed to allow the user to visually recognize the present position and the objective position by sight by overlapping them on the map on the picture plane of the display apparatus.

In the above explained navigation apparatuses, the following operations are performed, for example.

Now, a self vehicle which is the movable body is assumed to travel from a start position P0' to a final destination Pn'.

When the self vehicle position is located at the start position P0', if the operator gives the navigation apparatus an instruction to set the route positions automatically, the navigation apparatus calculates the scheduled route positions P1', P2', P3',..., Pn' along the route in this order on the basis of an algorithm set in advance.

Then, when the calculation of the scheduled route positions is finished, the navigation apparatus outputs a message to perform the route guidance on the basis of the scheduled route positions form the obtained scheduled route position P1' to the scheduled route position Pn' in the order.

In the above explained navigation apparatus, even if the self vehicle position has already passed through several route positions at the time of searching e.g. if the self vehicle is travelling while searching the route, the message is outputted such that the scheduled route position P1', which the self vehicle should firstly pass through, is still treated as the objective route position.

Thus, if the self vehicle has already passed through the scheduled route positions P1', P2' and P3' at the timing when it is ended to set up the scheduled route positions, the navigation apparatus outputs such a message that the next objective route position is the position P1' although it has in fact already passed through the scheduled route positions P1', P2' and P3'.

Therefore, there is a problem that, when such an erroneous message is outputted, the self vehicle may be guided in an incorrect direction, or the operator should perform an operation to cancel the message etc. if he recognizes the fact that it has already passed the pertinent position, and thus the operatability is degraded.

SUMMARY OF THE INVENTION

It is therefore an object of the present invention to provide a navigation apparatus and a navigation method, which can correctly inform the route guidance message.

The above object of the present invention can be achieved by a navigation apparatus for a movable body provided with: a measurement device for measuring a present position of the movable body; a setting device for setting route position information corresponding to a plurality of scheduled route positions which are scheduled to be passed on a route to a destination; a memory device for storing the present position at predetermined time intervals as passed position information between a start time, which is a time when the setting device starts to set the route position information, and an end time, which is a time when the setting device ends to set the route position information; a judgement device for judging whether or not the movable body has passed the scheduled route positions between the start time and the end time on the basis of the passed position information stored in the memory device, after the end time; and a guidance device for generating a message to guide the movable body from the measured present position to the destination on the basis of the scheduled route positions which the movable body has not passed yet according to a judgement result of the judgement device.

According to the navigation apparatus of the present invention, the setting device sets route position information corresponding to a plurality of scheduled route positions which are scheduled to be passed on a route to a destination. The memory device stores the present position at predetermined time intervals as the passed position information between the start time and the end time. After the end time i.e. after the setting device ends to set the route position information, the judgement device judges whether or not the movable body has passed the scheduled route positions between the start time and the end time on the basis of the passed position information stored in the memory device. At this time, the guidance device generates a message to guide the movable body from the measured present position to the destination on the basis of the scheduled route positions which the movable body has not passed yet according to the judgement result of the judgement device. Consequently, even if the movable body has already passed a scheduled route position while the setting device is setting the scheduled route position and the movable body keeps on moving, the route guidance corresponding to the present position of the actual movable body can be precisely performed according to the navigation apparatus of the present invention.

In the navigation apparatus of the present invention, the measurement device may have at least one of a geomagnetic sensor, an angular speed sensor, a travel distance sensor and a GPS receiver. Thus, the measurement of the present position can be precisely and reliably performed.

In one aspect of the navigation apparatus of the present invention, the setting device may have an input device through which the route position information can be manually set. Thus, the desirable route position can be manually set according to the operator's interaction. Alternatively, the setting device may have a device for automatically set the route position information in correspondence with the route to the destination. Thus, the setting operation can be performed without the operator's interaction.

In another aspect of the navigation apparatus of the present invention, the guidance device may have a display device for displaying the message. Thus, the operator can easily watch the message. Alternatively, the guidance device may have a voice outputting device for outputting the message by a synthetic voice. Thus, the operator can easily listen to the message.

In another aspect of the navigation apparatus of the present invention, the memory device may have a ring buffer for updating the stored passed position information one after another as the present position is newly detected by the measurement device. Thus, the memory capacity required to the memory device can be relatively little.

The above object of the present invention can be also achieved by a navigation method for a movable body provided with the steps of: measuring a present position of the movable body; setting route position information corresponding to a plurality of scheduled route positions which are scheduled to be passed on a route to a destination; storing the present position at predetermined time intervals as passed position information between a start time, which is a time when the setting device starts to set the route position information, and an end time, which is a time when the setting device ends to set the route position information; judging whether or not the movable body has passed the scheduled route positions between the start time and the end time on the basis of the passed position information stored in the storing step, after the end time; and generating a message to guide the movable body from the measured present position to the destination on the basis of the scheduled route positions which the movable body has not passed yet according to a judgement result in the judging step.

According to the navigation method of the present invention, the route position information is set corresponding to a plurality of scheduled route positions which are scheduled to be passed on a route to a destination. The present position is stored at predetermined time intervals as passed position information between the start time and the end time. After the end time i.e. after it is ended to set the route position information, it is judged whether or not the movable body has passed the scheduled route positions between the start time and the end time on the basis of the passed position information stored in the storing step. At this time, the message is generated to guide the movable body from the measured present position to the destination on the basis of the scheduled route positions which the movable body has not passed yet according to the judgement result in the judgement step. Consequently, even if the movable body has already passed a scheduled route position while the scheduled route position is being set and the movable body keeps on moving, the route guidance corresponding to the present position of the actual movable body can be precisely performed according to the navigation method of the present invention.

In the measuring step, the present position may be measured by at least one of a geomagnetic sensor, an angular speed sensor, a travel distance sensor and a GPS (Global Positioning System) receiver. Thus, the measurement of the present position can be precisely and reliably performed.

In one aspect of the navigation method of the present invention, the route position information may be manually set in the setting step. Thus, the desirable route position can be manually set according to the operator's interaction. Alternatively, the route position information may be automatically set in correspondence with the route to the destination in the setting step. Thus, the setting operation can be performed without the operator's interaction.

In another aspect of the navigation method of the present invention, the generating step may have the step of displaying the message. Thus, the operator can easily watch the message. Alternatively, the generating step may have the step of outputting the message by a synthetic voice. Thus, the operator can easily listen to the message.

In another aspect of the navigation method of the present invention, the stored passed position information may be updated one after another as the present position is newly detected in the storing step. Thus, the memory capacity required in the storing step can be relatively little.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 3 is a diagram for explaining a travelling locus buffer area in a memory of the embodiment;

DETAILED DESCRIPTION OF THE PREFERRED EMBODIMENT

Referring to the accompanying drawings, a preferred embodiment of the present invention will be now explained.

Figure 1:
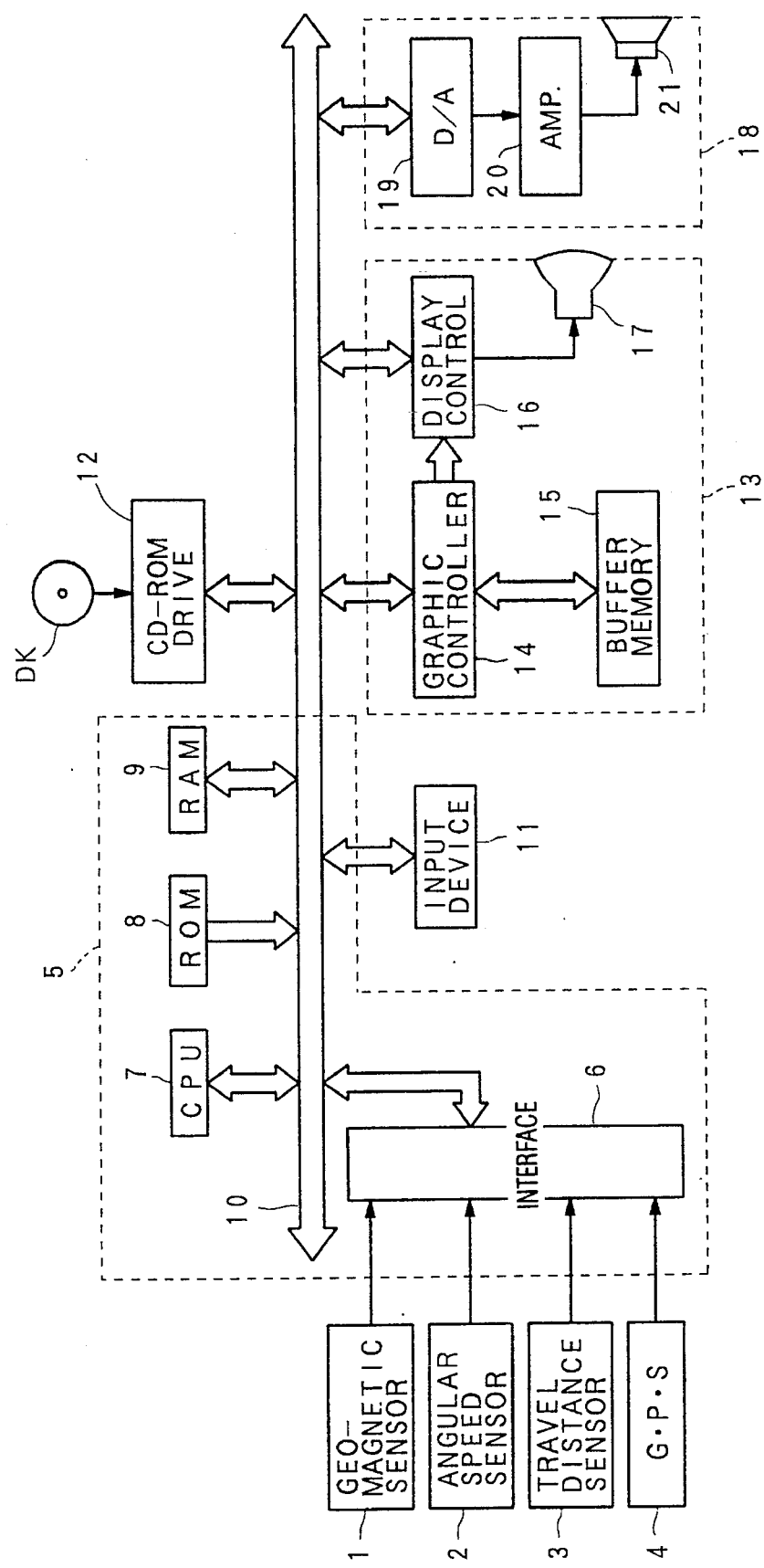
FIG. 1 is a block diagram showing a summarized construction of a navigation apparatus as an embodiment of the present invention.

FIG. 1 is a block diagram showing a basic construction of an on-vehicle navigation system as an embodiment of the present invention.

In FIG. 1, the on-vehicle navigation system is provided with: a geomagnetic sensor 1 for outputting an azimuth data of an advance direction of a self vehicle; an angular speed sensor 2 for detecting an angular speed at the time of the rotation of the self vehicle and outputting an angular speed data; a travel distance sensor 3 for outputting a travel distance data by detecting and integrating the number of rotations of a shaft; a GPS receiver 4 for receiving electric waves from GPS satellites and outputting GPS measurement data; a system controller 5 for controlling a whole navigation system on the basis of the azimuth data, the angular speed data, the travel distance data and the GPS measurement data; an input device 11 for inputting various data; a CD-ROM (Compact Disk-Read Only Memory) drive 12 for reading and outputting various data from a CD-ROM disk DK under the control of the system controller 5; a display unit 13 for displaying various display data under the control of the system controller 5; and an audio reproducing unit 18 for reproducing and outputting various voice data under the control of the system controller 5.

The system controller 5 is provided with: an interface unit 6 for performing an interface operation with the external; a CPU 7 for controlling the whole portion of the system controller 5; a ROM (Read Only Memory) 8 for storing a control program to control the system controller 5; and a RAM (Random Access Memory) 9 having a non-volatile memory not shown for storing various data in a writable manner. The input device 11, the CD-ROM drive 12, the display unit 13 and the audio reproducing unit 18 are connected via a bus line 10.

The display unit 13 is provided with: a graphic controller 14 for performing a control of the whole portion of the display unit 13 on the basis of the control data form the CPU 7 which are transmitted through the bus line 10; a buffer memory 15 consisting of a memory such as a VRAM (Video RAM), for temporarily storing image information, which can be immediately displayed; and a display control unit 16 for controlling the display of the display device 17 such as a liquid crystal display device, a CRT (Cathode Ray Tube) on the basis of the image data outputted from the graphic controller 14.

The audio reproducing unit 18 is provided with: a D/A convertor 19 for performing a digital/analog conversion of audio voice digital data transmitted through the bus line 10 from the CD-ROM drive 12 or the RAM 9; an amplifier 20 for amplifying an audio analog signal outputted from the D/A convertor 19; and a speaker 21 for converting the amplified audio analog signal to the audio vibration and outputting it.

Figure 2:
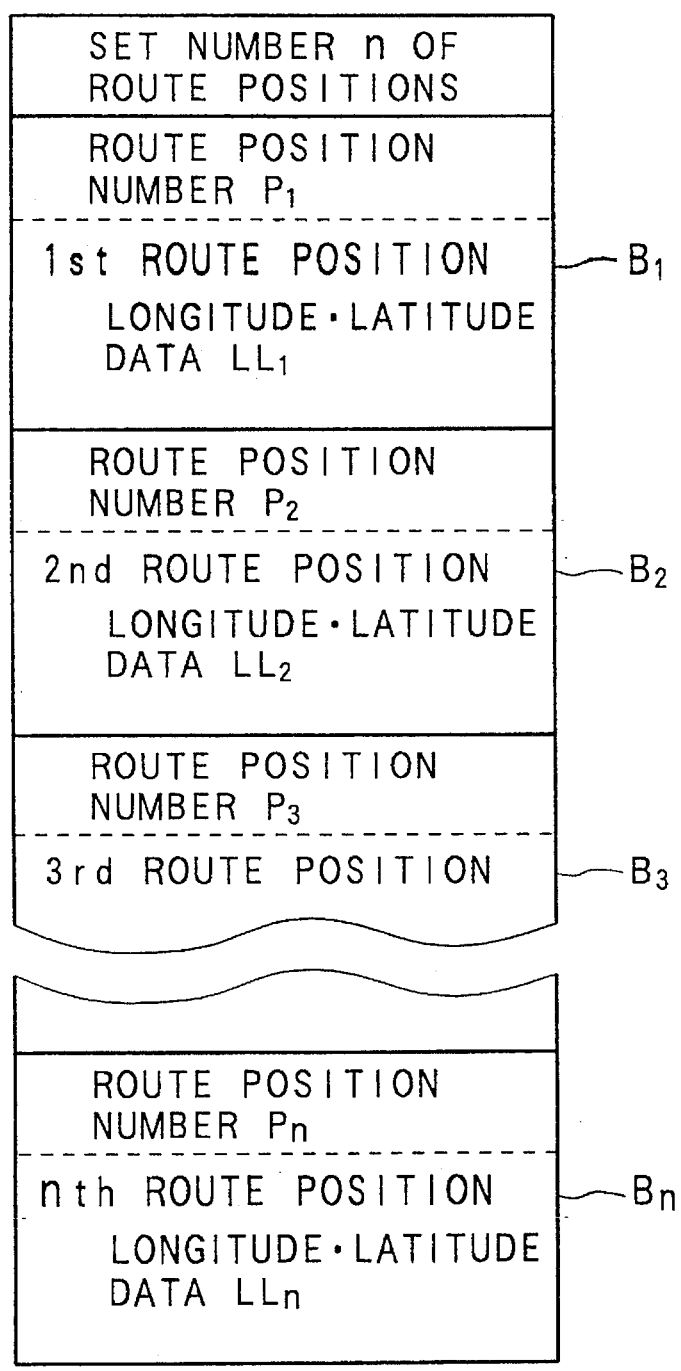
FIG. 2 is a diagram for explaining a construction of route data used in the embodiment.

In the RAM 9, it is possible to store the route data of the movable body as shown in FIG. 2. The route data B1 to Bn may be manually set by a driver of the movable body or an operator of the navigation apparatus, or may be automatically set.

The route data are block-divided into n route position indicated by the set number data n of route positions. In each blocks B1 to Bn, route position number data P1 to Pn to identify the route position, and the longitude and latitude data LL1 to LLn of each route position etc. are stored.

In the RAM 9, there is provided a travelling locus buffer area LOB as shown in FIG. 3, for storing the locus data (actual passed position data: the longitude and latitude data at the pertinent timing) $LO_1$ to $LO_m$ in association with pointer (1 to m) on the basis of the azimuth data, the angular speed data, the travelling distance data and the GPS measurement data for each predetermined time interval. In addition, this travelling locus buffer area LOB has a ring buffer structure, and is updated by new travelling locus data one after another. As for the specification of the storing position of the updated travelling locus data, a pointer is used.

Figure 4:
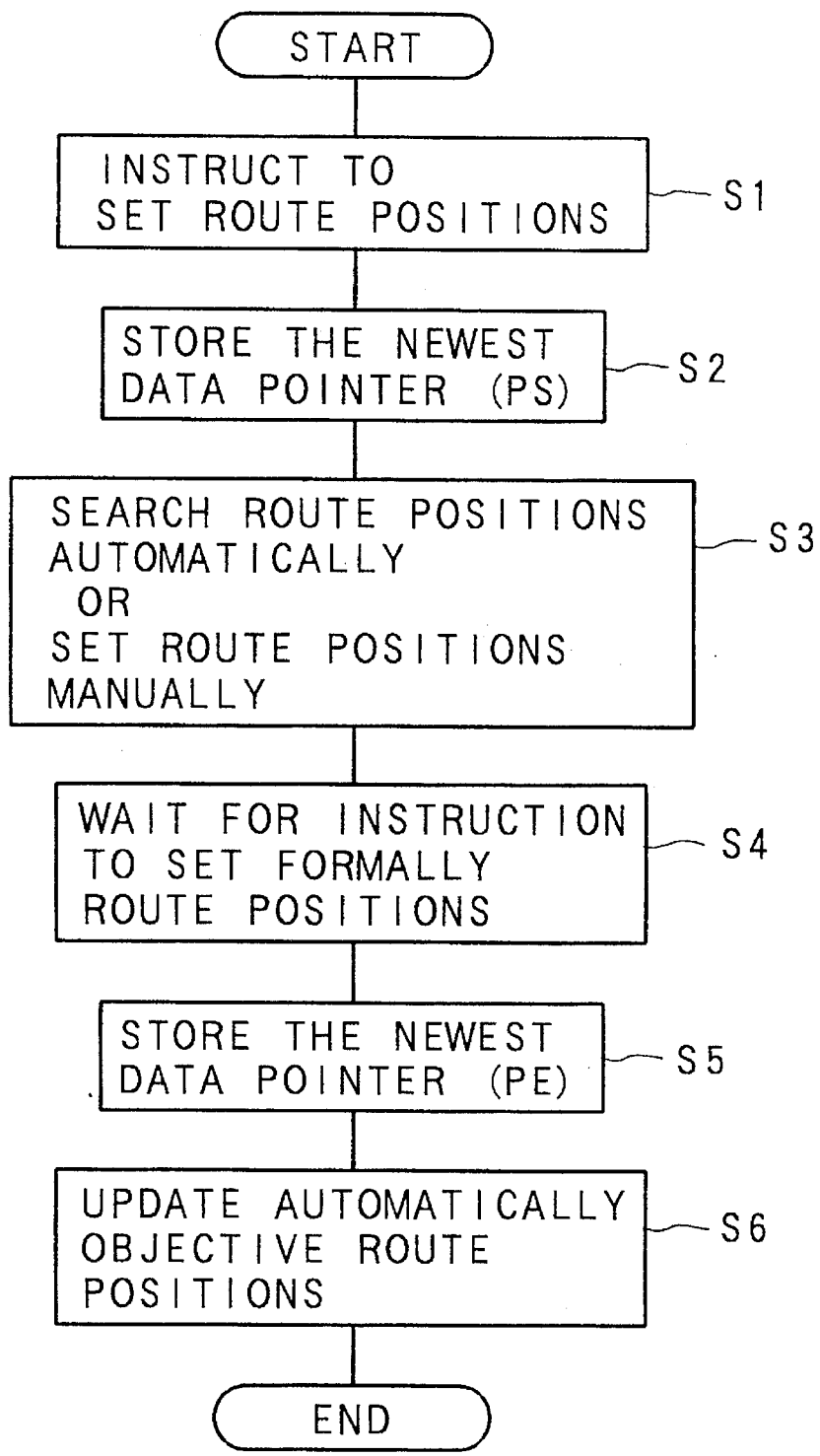
FIG. 4 is a flow chart of an operation process of the embodiment.

Nextly, the operation of the embodiment will be explained with referring to FIG. 3, FIG. 4 and FIG. 5.

In this case, the system controller 5 automatically searches and sets the route positions i.e., sets the route data on the basis of the stored data of the CD-ROM DK.

When the instruction to automatically set the route data with respect to the final objective position is inputted to the system controller 5 through the input device 11 (step S1), the system controller 5 stores the newest data pointer Ps (Ps =3 in the example of FIG. 3) which indicates the storing position of the newest locus data (the newest passed position data) from the traveling locus buffer LOB in the RAM 9, and the newest passed position is determined as the start position P0 (step S2).

Nextly, the system controller 5 searches the route positions automatically and calculates a plurality of route data (step S3). The route positions may be set manually.

Nextly, the system controller 5 is set in a condition to wait for the operator to select one route data out of a plurality of the calculated route data via the input device 11 (step S4).

When the operator gives the instruction to select either of the scheduled route position data group, the selected route data is adopted as the formal route data.

At the timing of inputting this selection instruction, the system controller 5 stores the newest data pointer $P_E$ ($P_E$= m−1 in the example of FIG. 3) which indicates the storing position of the newest locus data (the newest passed position data) from the travelling locus buffer LOB in the RAM 9, and sets this newest passed position C as the search ending position Px (step S5). In this manner, the presently passed position is determined.

Nextly, the objective route positions are automatically updated by used of the route data from the start position P0 to the search ending position Px out of the route position number data P1 to Pn and the longitude and latitude data LL1 to LLn of each route position, which constitute the selected route data, i.e. the travelling locus data $LO_3$ to $LO_{m-1}$, by assuming that it has pseudo-travelled (step S6), and the message for the actual route guidance is outputted after the automatic updating operation.

More concretely, it is assumed that the automatic setting instruction of the route data is inputted when the self vehicle position is located at the position P0, and that the route data setting operation is completed when the self vehicle reaches the position Px via the positions P1, P2 and P3 after travelling.

During this setting period, the travelling locus data stored in the travelling locus data buffer LOB become the travelling locus data $LO_3$ to $LO_{m-1}$ corresponding to the pointer $P_s$ =3 to Pointer $P_E$ =m−1.

Figure 5:
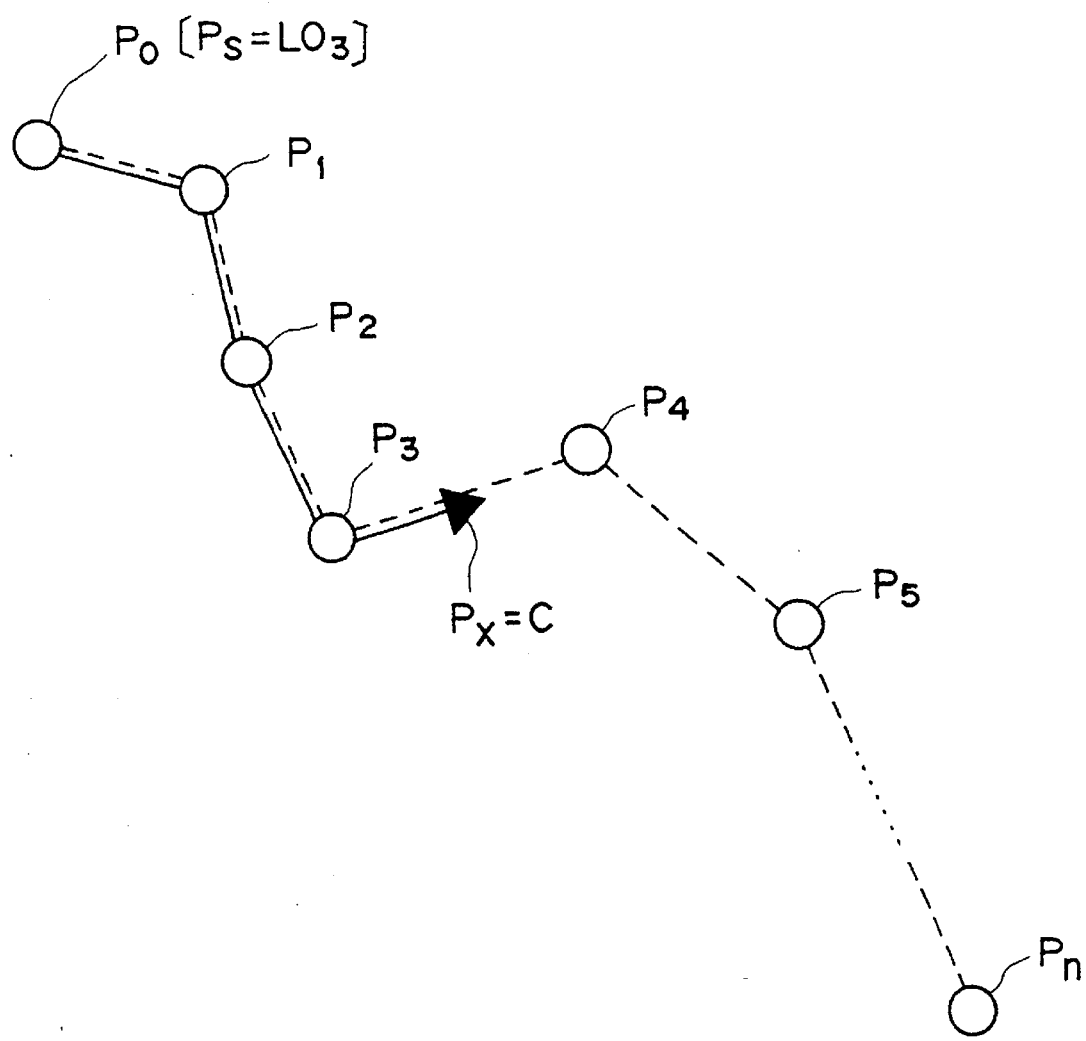
FIG. 5 is a diagram for explaining an operation of the embodiment.

Therefore, by use of those travelling locus data $LO_3$ to $LO_{m-1}$, the updating operation of the objective route position is performed by assuming that it has travelled from the starting position P0 as shown by a solid line in FIG. 5 one after another. Namely, by assuming that it has already passed the positions corresponding to the route position number P1 to P3 which are the route positions so that, if the self vehicle position is located at the position C, the message to indicate that the next objective route position is the position corresponding to the position P4 is displayed on the display device 17, or is informed to the operator by audio voice from the speaker 21.

As described above, according to the present embodiment, since it replays the travel at the position, where it has possibly already passed during setting the route data, by use of the travelling locus, the route guidance message for the position, at which the route data setting is actually completed under the condition same as the case in the self vehicle actually travels, can be displayed or informed by audio voice. Thus, an erroneous route guidance is not performed.

According to the present embodiment, even if the movable body has already passed a scheduled route position while setting the scheduled route position, since it is judged whether or not it has already passed the scheduled route position after setting the scheduled route position, and since the scheduled route position which is judged to have already passed is not treated as the route guidance object, the route guidance corresponding to the present position of the actual movable body can be precisely performed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A navigation apparatus for a movable body comprising:

measurement means for measuring a present position of said movable body;

setting means for setting route position information corresponding to a plurality of scheduled route positions which are scheduled to be passed on a route to a destination;

memory means for storing the present position at predetermined time intervals as passed position information between a start time, which is a time when said setting means starts to set the route position information, and an end time, which is a time when said setting means ends to set the route position information;

judgement means for judging whether or not said movable body has passed the scheduled route positions between the start time and the end time on the basis of the passed position information stored in said memory means, after the end time; and guidance means for generating a message to guide said movable body from the measured present position to the destination on the basis of the scheduled route positions which said movable body has not passed yet according to a judgement result of said judgement means.

2. A navigation apparatus according to claim 1, wherein said measurement means comprises at least one of a geomagnetic sensor, an angular speed sensor, a travel distance sensor and a GPS (Global Positioning System) receiver.

3. A navigation apparatus according to claim 1, wherein said setting means comprises an input means through which the route position information can be manually set.

4. A navigation apparatus according to claim 1, wherein said setting means comprises means for automatically set the route position information in correspondence with the route to the destination.

5. A navigation apparatus according to claim 1, wherein said guidance means comprises a display means for displaying the message.

6. A navigation apparatus according to claim 1, wherein said guidance means comprises a voice outputting means for outputting the message by a synthetic voice.

7. A navigation apparatus according to claim 1, wherein said memory means comprises a ring buffer for updating the stored passed position information one after another as the present position is newly detected by the measurement means.

8. A navigation method for a movable body comprising the steps of:

measuring a present position of said movable body;

setting route position information corresponding to a plurality of scheduled route positions which are scheduled to be passed on a route to a destination;

storing the present position at predetermined time intervals as passed position information between a start time, which is a time when said setting means starts to set the route position information, and an end time, which is a time when said setting means ends to set the route position information;

judging whether or not said movable body has passed the scheduled route positions between the start time and the end time on the basis of the passed position information stored in the storing step, after the end time; and generating a message to guide said movable body from the measured present position to the destination on the basis of the scheduled route positions which said movable body has not passed yet according to a judgement result in the judging step.

9. A navigation method according to claim 8, wherein in the measuring step, the present position is measured by at least one of a geomagnetic sensor, an angular speed sensor, a travel distance sensor and a GPS (Global Positioning System) receiver.

10. A navigation method according to claim 8, wherein in the setting step, the route position information is manually set.

11. A navigation method according to claim 8, wherein in the setting step, the route position information is automatically set in correspondence with the route to the destination.

12. A navigation method according to claim 8, wherein the generating step comprises the step of displaying the message.

13. A navigation method according to claim 8, wherein the generating step comprises the step of outputting the message by a synthetic voice.

14. A navigation method according to claim 8, wherein in the storing step, the stored passed position information is updated one after another as the present position is newly detected.

* * * * *